(12) United States Patent
V et al.

(10) Patent No.: US 9,428,113 B2
(45) Date of Patent: Aug. 30, 2016

(54) ROTATABLE AND STOWABLE PARCEL SHELF ASSEMBLY FOR A MOTOR VEHICLE

(71) Applicant: GM GLOBAL TECHNOLOGY OPERATIONS LLC, Detroit, MI (US)

(72) Inventors: Babu Govardhan V, Bengaluru (IN); Tushar Rajaram Gawade, Dhule (IN); Deepak Kumar Soundararaju, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/244,356

(22) Filed: Apr. 3, 2014

(65) Prior Publication Data
US 2015/0283949 A1    Oct. 8, 2015

(51) Int. Cl.
*B60R 5/04* (2006.01)
*B60R 13/02* (2006.01)

(52) U.S. Cl.
CPC ........... *B60R 5/045* (2013.01); *B60R 13/0268* (2013.01)

(58) Field of Classification Search
CPC ..... B60P 3/007; B60R 13/0268; B60R 5/045
USPC ........................................... 296/24.43, 24.44
See application file for complete search history.

(56) References Cited

U.S. PATENT DOCUMENTS

| 4,351,555 A * | 9/1982 | Hashimoto | ................ 296/37.16 |
| 6,065,794 A * | 5/2000 | Schlachter | ................... 296/37.6 |
| 6,702,355 B1 * | 3/2004 | Price et al. | ................. 296/37.16 |

* cited by examiner

*Primary Examiner* — Glenn Dayoan
*Assistant Examiner* — Melissa A Black
(74) *Attorney, Agent, or Firm* — Quinn Law Group, PLLC

(57) ABSTRACT

A rotatable and stowable parcel shelf assembly for a motor vehicle is provided. The parcel shelf assembly may include a parcel shelf body having a first edge and at least one attachment feature configured to attach the parcel shelf body to the vehicle within a cargo area. The parcel shelf body first edge is disposed proximate a partition, which is disposed between the cargo area and a passenger compartment of the vehicle. The parcel shelf body may occupy one of a deployed position and a stowed position, and may be rotatable about the at least one attachment feature in a first direction from the deployed position to the stowed position and in a second direction from the stowed position to the deployed position. The parcel shelf body may be secured in the stowed position to prevent further rotation in the first direction from the stowed position into the cargo area.

15 Claims, 5 Drawing Sheets

ROTATABLE AND STOWABLE PARCEL SHELF ASSEMBLY FOR A MOTOR VEHICLE

TECHNICAL FIELD

The present invention relates to a rotatable and stowable parcel shelf assembly for a motor vehicle.

BACKGROUND

There are many occasions on which a vehicle owner may desire additional usable cargo space, such as for transporting luggage, furniture, camping gear, or other variously sized cargo items, without needing to stack items directly atop one another. Thus, there is a need for a parcel shelf rigid enough to support smaller cargo items in order to accommodate the stacking of cargo items, which is also stowable without being removed from the vehicle, in order to accommodate larger or taller cargo items.

SUMMARY

A rotatable and stowable parcel shelf assembly for a motor vehicle is provided. A vehicle having the parcel shelf assembly of the present invention may include a cargo area and a passenger compartment, which are at least partially separated by a partition. The vehicle may further include a plurality of trim pieces disposed proximate the partition within the cargo area.

The parcel shelf assembly may include a parcel shelf body having a plurality of edges including a first edge and a second edge. The parcel shelf assembly may further include at least one attachment feature configured to attach the parcel shelf body to the vehicle at the trim pieces. Specifically, the at least one attachment feature of the parcel shelf assembly may be configured to secure the parcel shelf body to the plurality of trim pieces, such that the first edge of the parcel shelf body is disposed adjacent to the partition.

The parcel shelf body may occupy one of a deployed position and a stowed position, and may be rotatable therebetween. In the deployed position, the parcel shelf acts as an additional storage shelf for storing additional cargo items and/or as a cover to conceal the contents of the vehicle cargo area. In the stowed position, the parcel shelf is securely stowed allowing larger items to be placed within the vehicle cargo area.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 5A:
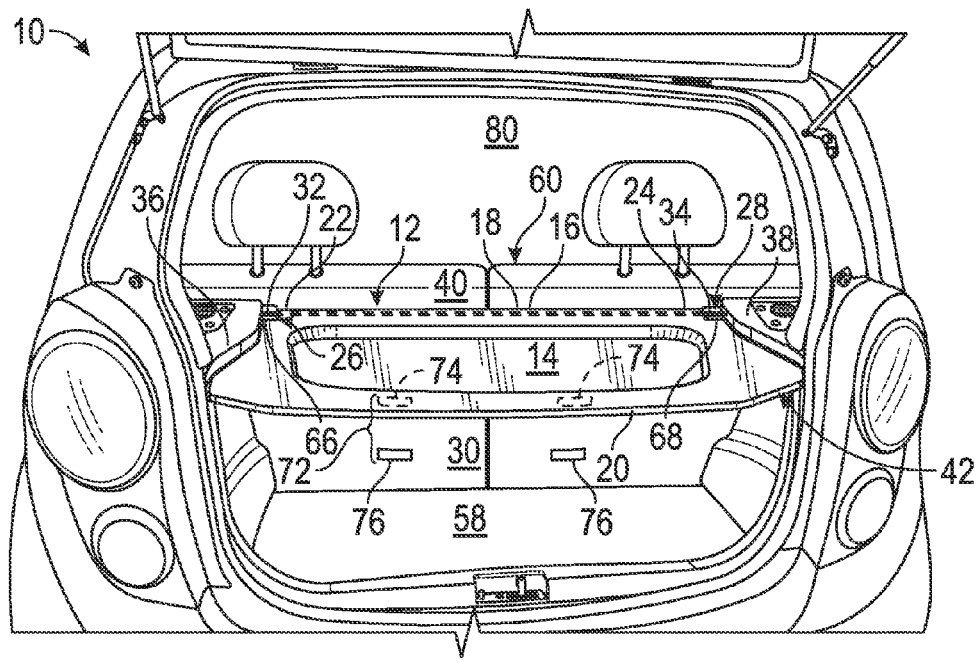
FIG. 5A is a schematic rear view illustration of an example parcel shelf assembly disposed within a cargo area of a vehicle with a partition in a locked upright position, wherein the parcel shelf body is shown in a deployed position.

Referring to the Figures, wherein like reference numbers correspond to like or similar components throughout the several views, a rotatable and stowable parcel shelf assembly 12 for a motor vehicle 10 is provided. The parcel shelf assembly 12 generally comprises a parcel shelf body 14 and at least one attachment feature 16 configured to secure the parcel shelf body 14 to the motor vehicle 10. Further, the parcel shelf body 14 is configured to occupy one of a deployed position 42 (FIGS. 2 and 5A) and a stowed position 44 (FIG. 5D). The parcel shelf body 14 is rotatable between the deployed position 42 and the stowed position 44.

Figure 1:
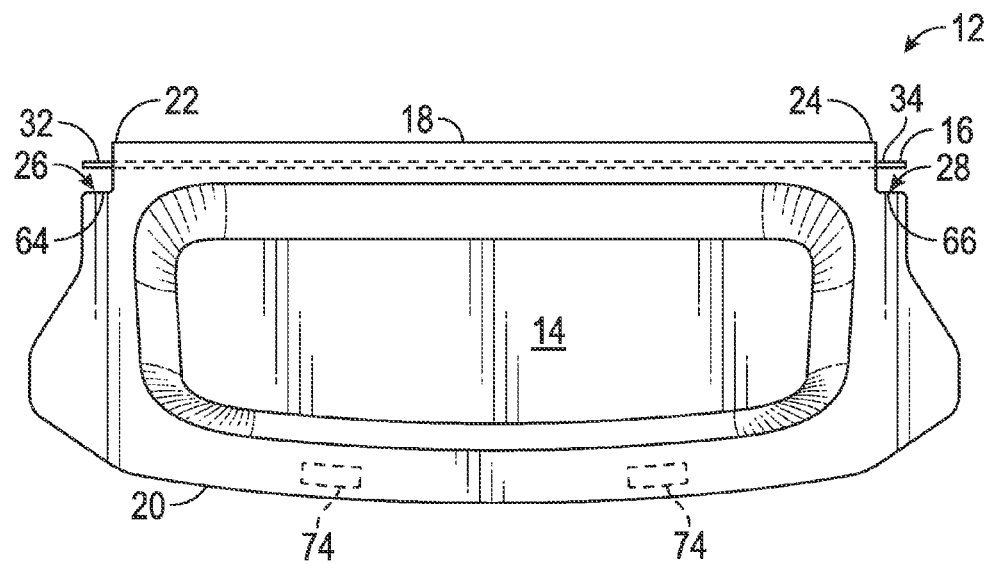
FIG. 1 is a schematic plan view illustration of an example parcel shelf body of the parcel shelf assembly, wherein the parcel shelf body has at least one section.

Referring to FIG. 1, the parcel shelf body 14 is shown. The parcel shelf body 14 may be a rigid parcel shelf body capable of supporting a load such as packages, luggage, and other cargo items. The parcel shelf body 14 may have a plurality of edges 18, 20. The plurality of edges 18, 20 may include at least a first edge 18 and a second edge 20. Further, the parcel shelf body 14 first edge 18 has a first end 22 and a second end 24.

The parcel shelf body 14 may further include a plurality of notches 26, 28. The plurality of notches may include at least a first notch 26 and a second notch 28. The first notch 26 may be located at the first end 22 of the first edge 18. The second notch 28 may be located at the second end 24 of the first edge 18 of the parcel shelf body 14.

The parcel shelf assembly 12 further includes at least one attachment feature 16 configured to secure the parcel shelf body 14 within a cargo area 30 (FIG. 2) of the vehicle 10. The at least one attachment feature 16 may be a hinge, a rod, or the like, about which the parcel shelf body 14 may rotate. The at least one attachment feature 16 is shown in the Figures as a rod disposed and integrally connected to the parcel shelf body 14 along the first edge 18.

Figure 2:
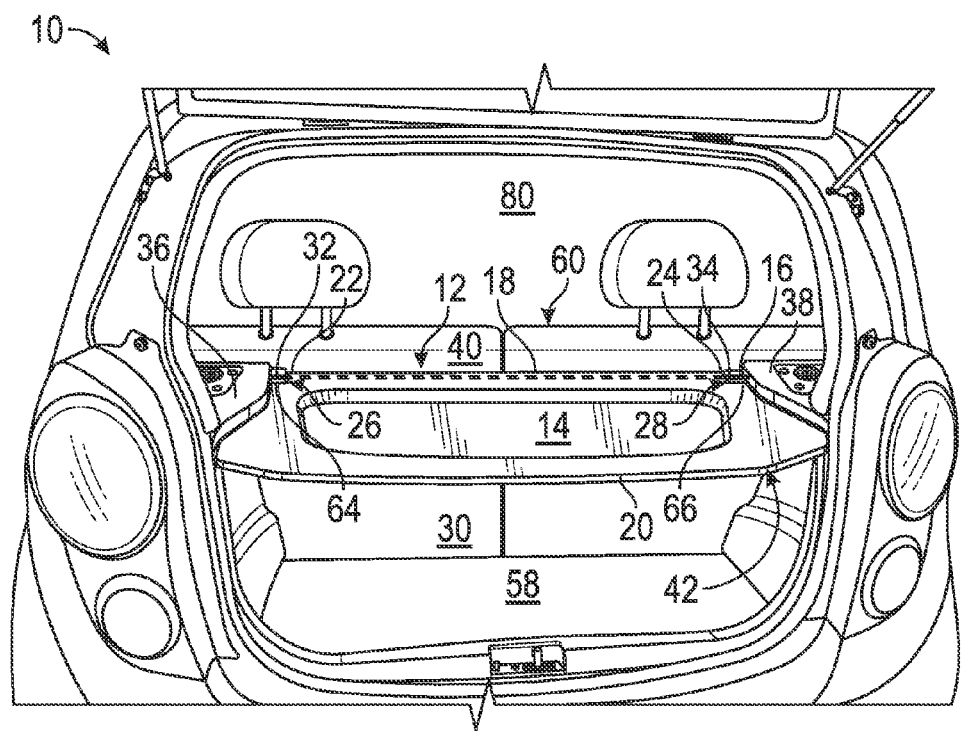
FIG. 2 is a schematic rear view illustration of an example parcel shelf assembly disposed in a cargo area of a vehicle with a partition shown in a locked upright position, wherein the parcel shelf body has one section.

Referring to FIG. 2, a vehicle 10 equipped with the parcel shelf assembly 12 of the present invention may have a vehicle structure that defines a passenger compartment 80 and a cargo area 30. The cargo area 30 may be defined by a plurality of cargo area boundaries. The cargo area boundaries may include, at least, a partition 40 disposed between and at least partially separating the passenger compartment 80 and the cargo area 30. The partition 40 may be any structure that at least partially separates the cargo area 30 and the passenger compartment 80. In the example embodiment shown in the Figures, the partition 40 is shown as a foldable bench seat configured to occupy one of a upright locked position 60 and a folded cargo position 62. Examples of additional cargo area boundaries may include, but are not limited to, a plurality of vehicle side walls, a vehicle roof, a vehicle floor 58, a rear hatch closure panel, a plurality of truck bed walls, and a pick-up truck lift gate or tailgate.

Referring to FIGS. 1 and 2, the parcel shelf assembly 12 may be disposed within the cargo area 30 of the vehicle 10 proximate to the partition 40. The at least one attachment feature 16 may have at least two attachment points 32, 34. The at least two attachment points 32, 34 include a first attachment point 32 and a second attachment point 34. The at least one attachment feature 16 is configured to attach the parcel shelf body 14 to the motor vehicle 10 at the first attachment point 32 and the second attachment point 34, as shown in FIG. 2. The first attachment point 32 may interconnect with, and attach the parcel shelf body 14 to the motor vehicle 10, at a first trim piece 36. The second attachment point 34 may interconnect with, and attach the parcel shelf body 14 to the motor vehicle 10, at a second trim piece 38. The first trim piece 36 and the second trim piece 38 may be disposed within the vehicle cargo area 30 proximate to the partition 40, such that when the parcel shelf assembly 12 is attached to the vehicle 10 via the first trim piece 36 and the second trim piece 38, the parcel shelf body 14 first edge 18 is disposed adjacent to the partition 40.

Figure 3A:
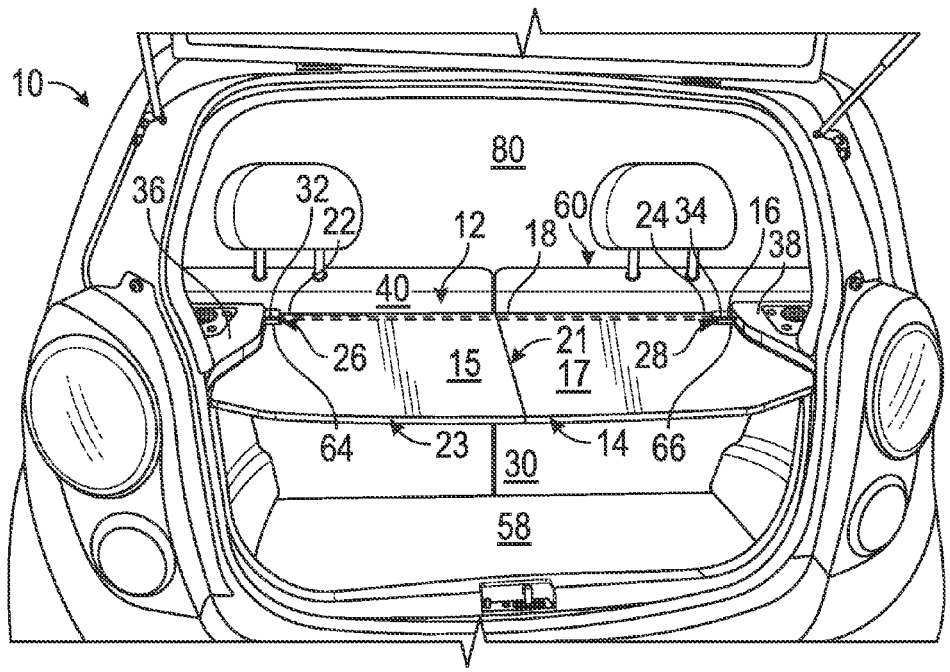
FIG. 3A is a schematic rear view illustration of an example parcel shelf assembly disposed in a cargo area of a vehicle with a partition in the locked upright position, wherein the parcel shelf body has at least two sections, the first section shown in a first position.
Figure 3B:
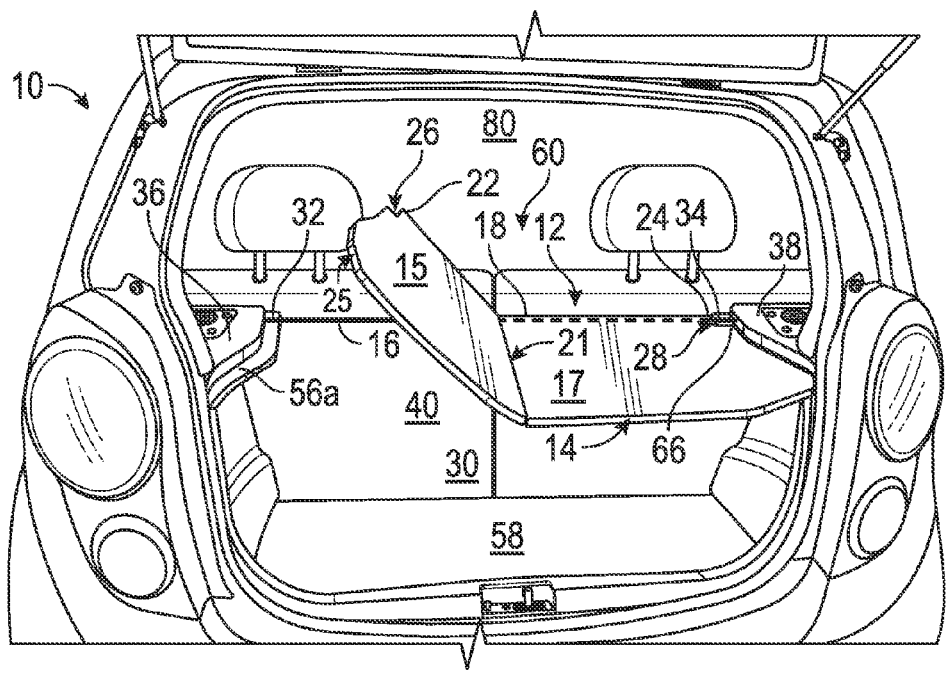
FIG. 3B is a schematic rear view illustration of an example parcel shelf assembly disposed in the cargo area of the vehicle with a partition in a locked upright position, wherein the parcel shelf body has at least two sections, and wherein a first section is shown in a second position, allowing for the stackable storage of cargo upon and below the second section and the storage of larger cargo items in the area occupied by the first section, when the first section is in the first position.

Referring to FIGS. 3A-3B and 4A-4B, the parcel shelf body 14 includes at least one section, and may include a plurality of moveable sections. In FIGS. 3A and 3B, the parcel shelf body 14 has at least a first section 15 and a second section 17. Each of the first section 15 and second section 17 may rotate about an at least one joint 21, such that each moveable section 15, 17 may occupy one of a first position 23 (FIG. 3A) and a second position 25 (FIG. 3B), when the parcel shelf body 14 occupies the deployed position 42.

Figure 4A:
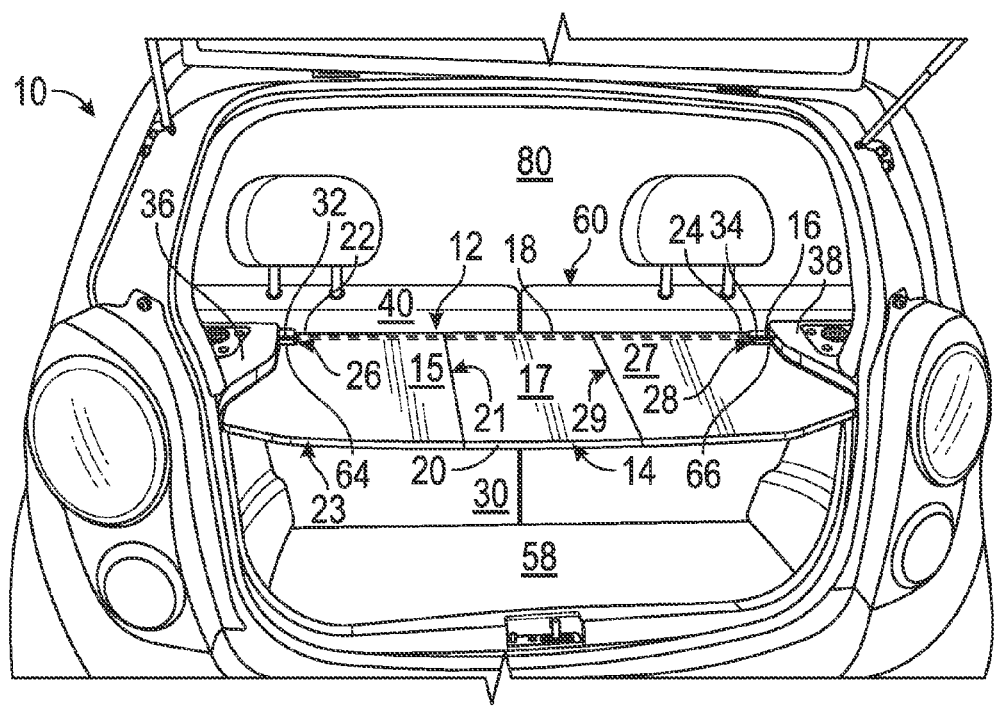
FIG. 4A is a schematic rear view illustration of an example parcel shelf assembly disposed within the cargo area of the vehicle with a partition in a locked upright position, wherein the parcel shelf body has at least three sections, each of the three sections shown in the first position.
Figure 4B:
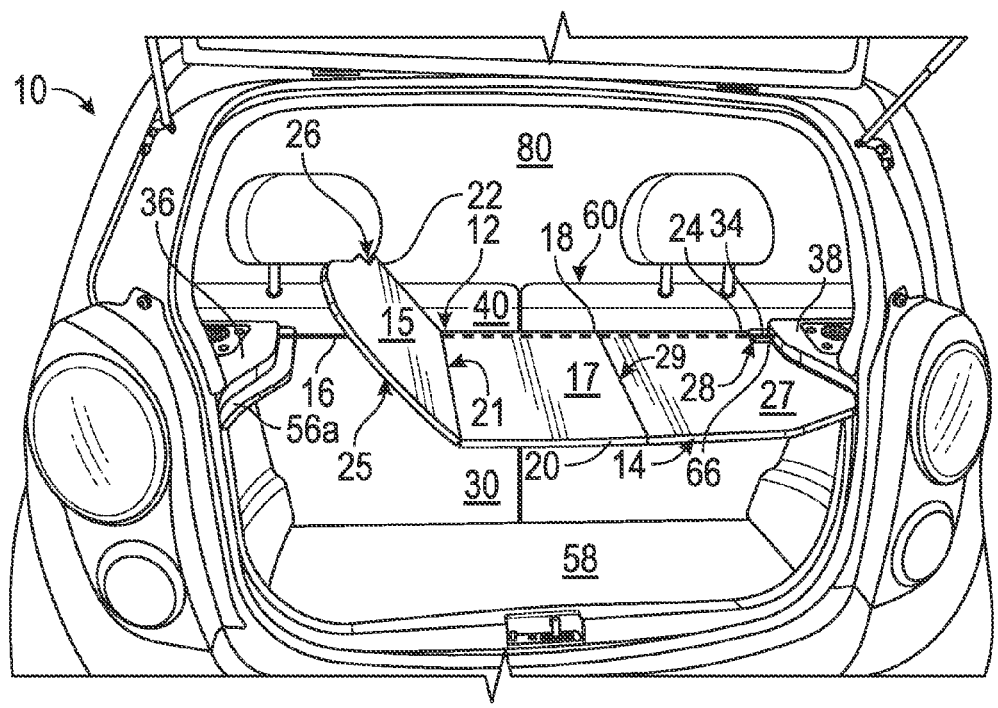
FIG. 4B is a schematic rear view illustration of an example parcel shelf assembly, disposed in the cargo area of a vehicle with a partition in a locked upright position, wherein the parcel shelf body has at least three sections and wherein the first section is shown in a second position, allowing for the stackable storage of cargo upon and below the second section and the third section and allowing for the storage of larger cargo items in the area occupied by the first section when the first section is in the first position.

In FIGS. 4A and 4B, the parcel shelf body 14 has at least a first section 15, a second section 17, and a third section 27. The first section 15 may rotate about a first joint 21; the first section 15 and the second section 17 may rotate about a second joint 29, such that each of the first section 15 and the second section 17 may occupy one of a first position 23 (FIG. 4A) and a second position 25 (FIG. 4B) when the parcel shelf body 14 occupies the deployed position 42.

Rotation of the respective sections 15, 17 between a first position 23 and a second position 25 allows the parcel shelf body 14 to provide a rigid shelf for additional cargo in the cargo area 30, as well as an area in which the full height of the cargo area 30 may be utilized to store taller cargo items.

Referring to FIGS. 5A-5D, the parcel shelf body 14 is rotatable about the at least one attachment feature 16 shown along axis A. The parcel shelf body 14 may further occupy one of the deployed position 42 (FIG. 5A) and the stowed position 44 (FIG. 5D).

The parcel shelf body 14 is rotatable about the first attachment feature 16, and is attachable to the vehicle 10 within the vehicle cargo area 30 at the first attachment point 32 via the first trim piece 36 and the second attachment point 34 via the second trim piece 38.

Figure 5B:
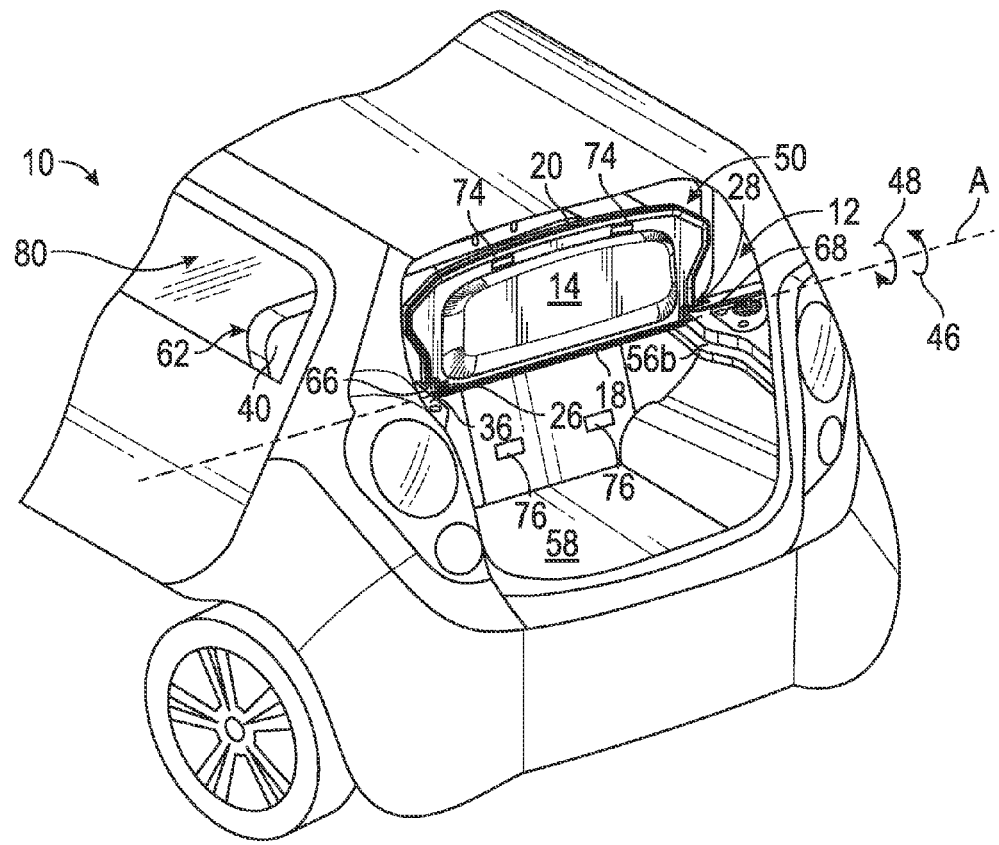
FIG. 5B is a schematic perspective view illustration of an example parcel shelf assembly disposed within a cargo area of a vehicle with a partition in a folded cargo position, wherein the parcel shelf body is shown in a first intermediate position occupied during a transition from the deployed position to the stowed position.
Figure 5C:
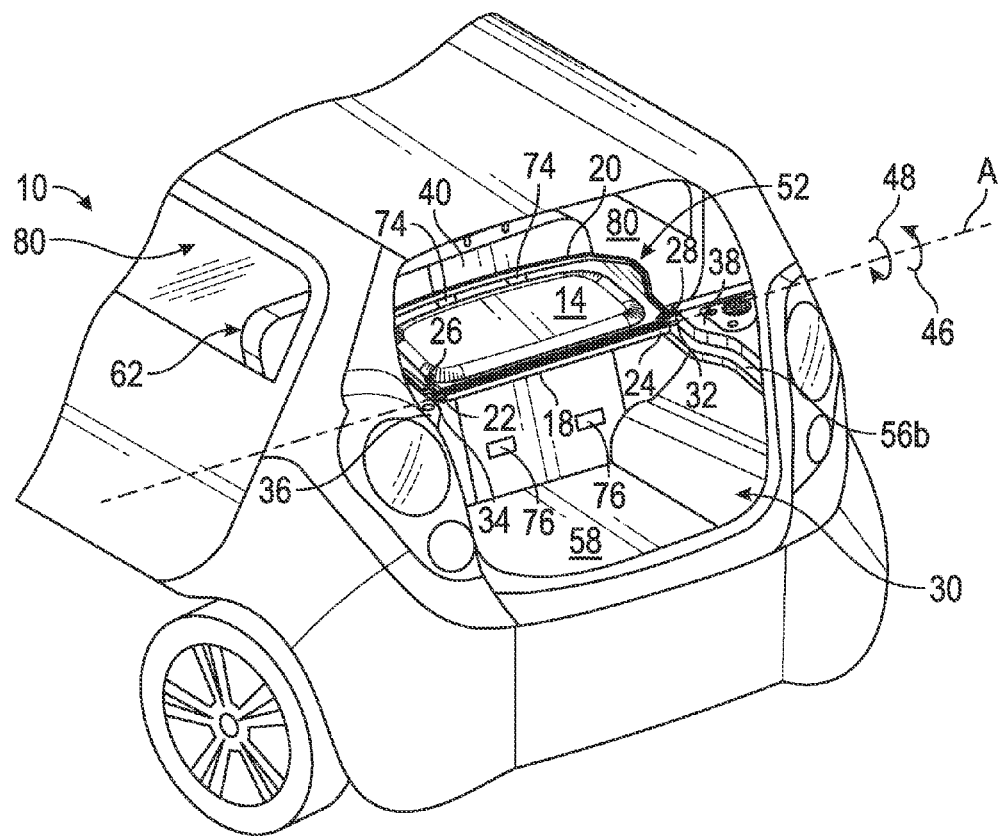
FIG. 5C is a schematic perspective view illustration of an example parcel shelf assembly disposed within a cargo area of a vehicle with a partition in a folded cargo position, wherein the parcel shelf body is shown in a second intermediate position, occupied during a transition from the deployed position to the stowed position.
Figure 5D:
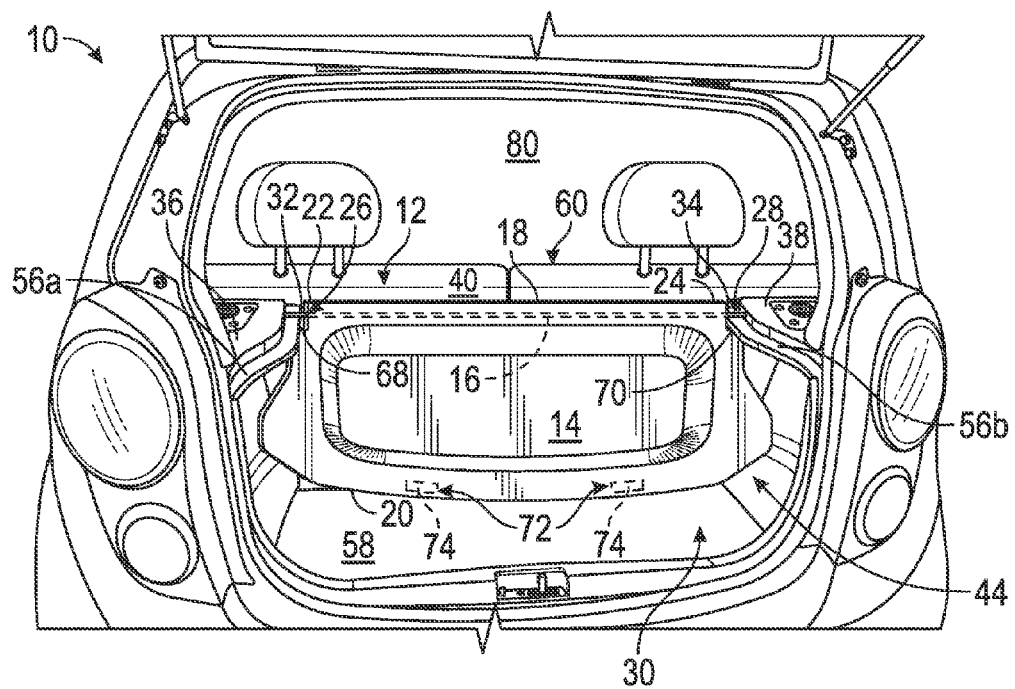
FIG. 5D is a schematic rear view illustration of an example parcel shelf assembly disposed within a cargo area of a vehicle with a partition in a locked upright position, wherein the parcel shelf body is shown in a stowed position.

Each of the first trim piece 36 and the second trim piece 38 include a lip 56a, 56b (shown in FIGS. 5B, 5C). The first trim piece 36 may include a first lip 56a; the second trim piece 38 may include a second lip 56b. Each of the first lip 56a and the second lip 56b may be integrally formed along the interior of the respective first trim piece 36 and second trim piece 38 and extend from one of the first trim piece 36 and second trim piece 38 into the cargo area 30.

The parcel shelf body 14 is rotatable in a first direction 46 (FIG. 5B, 5C) when transitioned from the deployed position 42 (FIG. 5A) to the stowed position 44 (FIG. 5D). The parcel shelf body 14 is rotatable in a second direction 48 (FIG. 5B, 5C), when transitioned from the stowed position 44 (FIG. 5D) to the deployed position 42 (FIG. 5A).

Referring specifically to FIG. 5A, when the parcel shelf body 14 occupies the deployed position 42, the partition 40 (shown as a foldable bench seat) is locked in a locked upright position 60, wherein the partition 40 effectively separates, at least partially, the cargo area 30 from the passenger compartment 80. Further, in the deployed position 42, the parcel shelf body 14 may securely rest upon each of the first lip 56a and the second lip 56b (shown in FIG. 5B and 5C). In the deployed position 42, the parcel shelf body 14 defines a loading surface and is disposed substantially perpendicular to the partition 40, which occupies the locked upright position 60. The parcel shelf body 14 thereby forms a rigid shelf, which allows for cargo to be placed within the vehicle cargo area 30 on the vehicle floor 58, as well as upon the parcel shelf body 14. As such, in the deployed position 42, the parcel shelf assembly 12 creates a stackable medium for the organized packaging and/or arrangement of additional cargo items within the vehicle cargo area 30.

When transitioning from the deployed position 42 (FIG. 5A) to the stowed position 44 (FIG. 5D), the parcel shelf body 14 rotates about the first attachment feature 16 in the first direction 46 from the deployed position 42 (FIG. 5A) to a first intermediate position 50 (FIG. 5B). Referring specifically to FIG. 5B, the parcel shelf body 14 is shown in the first intermediate position 50. When the parcel shelf body 14 occupies the first intermediate position 50 the partition 40 is unlocked and rotated and/or folded in the first direction 46 away from the cargo area 30 to thereby occupy a folded cargo position 62. When in the folded cargo position 62, the partition 40 rotates toward the passenger compartment 80 and creates sufficient space for the parcel shelf body 14 to rotate in the first direction 46 from the deployed position 42 to the first intermediate position 50.

When transitioning from the deployed position 42 (FIG. 5A) to the stowed position 44 (FIG. 5D), the parcel shelf body 14 rotates about the first attachment feature 16 in the first direction 46 from the first intermediate position 50 (FIG. 5B) to a second intermediate position 52 (FIG. 5C). Referring specifically to FIG. 5C, the parcel shelf body 14 occupies the second intermediate position 52. When the parcel shelf body 14 is in the second intermediate position 52, the partition 40 occupies the folded cargo position 62. When in the folded cargo position 62, the partition 40 is rotated toward the passenger compartment 80, creating sufficient space for the parcel shelf body 14 to rotate in the first direction 46 from the first intermediate position 50 to the second intermediate position 52.

Finally, when transitioning from the deployed position 42 (FIG. 5A) to the stowed position 44 (FIG. 5D), the parcel shelf body 14 rotates about the first attachment feature 16 in the first direction 46 from the second intermediate position 52 (FIG. 5C) to the stowed position 44 (FIG. 5D). Referring specifically to FIG. 5D, the parcel shelf body 14 is shown in the stowed position 44. When the parcel shelf body 14 reaches the stowed position 44, the partition 40 is rotated in the second direction 48 from the folded cargo position 62 to the locked upright position 60. When the parcel shelf body 14 occupies the stowed position 44, the partition 40 occupies the locked upright position 60, in which the partition 40, at least partially, separates the passenger compartment 80 and the cargo area 30. When in the stowed position 44, the parcel shelf body 14 is stowed such that it is adjacent to and substantially parallel with the partition 40, thereby allowing large and/or tall cargo items to be placed upon the vehicle floor 58 and stowed in the entirely of the un-segmented cargo area 30.

Simply stated, the parcel shelf body 14 may be transitioned between a deployed position 42 and a stowed position 44 via the following steps. First, the partition 40 is provided in a locked upright position 60 and the parcel shelf body 14 is provided in a deployed position 42. The partition 40 is unlocked and rotated in the first direction 46 from the locked upright position 60 to the folded cargo position 62. The parcel shelf body 14 is then rotated, in the first direction, about the first attachment feature 16, from the deployed position 42 to the first intermediate position 50, to the second intermediate position 52, and finally to the stowed position 44. The parcel shelf body 14 is then secured in the stowed position 44, when the partition 40 is returned to the locked upright position 60.

The parcel shelf body 14 may also be returned to the deployed position 42 while the partition 40 occupies the folded cargo position 62. The parcel shelf body 14 is returned to the deployed position 42 by rotating the parcel shelf body 14 in the second direction 48, about the first attachment feature 16, from the stowed position 44, to the second intermediate position 52, to the first intermediate position 50, and finally back to the deployed position 42, wherein the parcel shelf body 14 rests upon the first and second lips 56a, 56b of the first and second trim pieces 36, 38. Once the parcel shelf body 14 is secured in the deployed position 42, the partition 40 may then be rotated in the second direction 48 from the folded cargo position 62 to the locked upright position 60 and locked in place.

Referring back to FIGS. 1, 2, and 5A-5D, when in the stowed position 44, the parcel shelf body 14 may create unnecessary noise if not secured or held in place. Further, the parcel shelf body 14 may over-rotate into the cargo area 30 if the rotation thereof, about the first attachment feature 16, in the first direction 48 is not constrained. To combat such movement or over-rotation, in a first example embodiment, the plurality of notches 26, 28 formed along the first edge 18 of the parcel shelf body 14 are configured to control the rotation in the first direction 46 and second direction 48. In a second example embodiment, such movement or over-rotation is combatted via a coupling mechanism 72 configured to secure the parcel shelf body 14 to the partition 40, when the parcel shelf body 14 occupies the stowed position 44.

Referring again to FIGS. 5A-5D, in a first example embodiment, the first notch 26 formed on the parcel shelf body 14 may include a first abutment edge 64 and the second notch 28, formed on the parcel shelf body 14, may include a second abutment edge 66 (also shown in FIG. 1). Each of the first abutment edge 64 and the second abutment edge 66 are formed and disposed substantially parallel to the first edge 18.

In the first example embodiment, the first notch 26 and the second notch 28 allow for free rotation from the deployed position 42 to the stowed position 44 in the first direction 46 and free rotation from the stowed position 44 to the deployed position 42, in the second direction 48. However, the parcel shelf body 14 is secured in the stowed position 44, via an interaction between the first abutment edge 64 and the first trim piece 36 lip 56a and an interaction between the second abutment edge 66 and the second trim piece 38 lip 56b. The interaction between the first abutment edge 64 and the first trim piece 36 lip 56a defines a first abutment 68 (FIG. 5D). The interaction between the second abutment edge 66 and the second trim piece 38 lip 56b defines a second abutment 70 (FIG. 5D). The first abutment 68 and the second abutment 70 along with the partition 40 secure the parcel shelf body 14 in the stowed position 44. The first abutment 68 and the second abutment 70 further control the rotation of the parcel shelf body 14 in the first direction 46 from the stowed position 44 further into the cargo area 30, e.g., from the stowed position 44 to the deployed position 42, thereby requiring the parcel shelf body 14 to be transitioned from the stowed position 44 to the deployed position 42 via rotation about the first attachment feature 16 exclusively in the second direction 48.

In the second example embodiment, the parcel shelf body 14 is secured in the stowed position 44 via a coupling mechanism 72 configured to couple the parcel shelf body 14 to the partition 40, when the parcel shelf body 14 is in the stowed position 44. The coupling mechanism 72 may be a fabric hook and loop fastener, a removable button engagement, or another suitable attachment and detachment medium. For example, the coupling mechanism 72 may have two securing features 74, 76, a first securing feature 74 disposed on the parcel shelf body 14 and a second securing feature 76 disposed on the partition 40.

The first securing feature 74 disposed on the parcel shelf body 14 may be one of a hook arrangement and loop arrangement and the second securing feature 76 disposed on the partition 40 may be one of a loop arrangement and a hook arrangement, wherein one securing feature 74, 76 is a hook arrangement and one securing feature 74, 76 is a loop arrangement, such that when the securing features 74, 76 are coupled the parcel shelf body 14 is secured to the partition 40 via a hook and loop engagement.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A parcel shelf assembly for a motor vehicle having a passenger compartment, a cargo area, and a vehicle floor, the passenger compartment and the cargo area being at least partially separated by a partition, the parcel shelf assembly comprising:
a parcel shelf body having a plurality of edges including at least a first edge and a second edge, such that the first edge has a first end and a second end, and wherein the parcel shelf body further includes a plurality of notches disposed along the first edge;
a first attachment feature configured to directly attach the parcel shelf body to the vehicle along the first edge of the parcel shelf body, such that the first attachment feature attaches the first end of the first edge of the parcel shelf body to the vehicle at a first trim piece and attaches the second end of the first edge of the parcel shelf body to the vehicle at a second trim piece, wherein each of the first trim piece and the second trim piece are disposed in the cargo area of the vehicle;
wherein the parcel shelf body is disposed in the cargo area and proximate to the partition and is further configured to selectively occupy each of a deployed position and a stowed position, such that the parcel shelf body is rotatable about the first attachment feature in a first direction from the deployed position to the stowed position and the parcel shelf body is rotatable about the first attachment feature in a second direction from the stowed position to the deployed position, and wherein when the parcel shelf body occupies the stowed position, each of the first edge and the second edge of the parcel shelf body is adjacent to the partition, the parcel shelf body is substantially parallel with the partition, and the second edge of the parcel shelf body is positioned between the vehicle floor and the first edge of the parcel shelf body, such that the second edge is disposed closer to the vehicle floor than the first edge of the parcel shelf body; and
wherein each of the plurality of notches is configured to control the rotation of the parcel shelf body between the deployed position and the stowed position, such that when the parcel shelf body occupies the stowed position the plurality of notches interacts with each of the first trim piece and the second trim piece, such that the interaction between one of the plurality of notches and the first trim piece and another of the plurality of notches and the second trim piece restrains the parcel shelf body from rotating in the first direction from the stowed position into the cargo area.

2. The parcel shelf assembly of claim 1 wherein the parcel shelf body is secured in the stowed position via at least one coupling mechanism configured to couple the parcel shelf body with the partition.

3. The parcel shelf assembly of claim 1 wherein the first attachment feature is a hinge having at least two attachment points configured to attach the parcel shelf body within the cargo area of the vehicle, such that the at least two attachment points include at least a first attachment point and a second attachment point.

4. The parcel shelf assembly of claim 3 wherein the parcel shelf body is attached to the first trim piece at the first attachment point and the parcel shelf body is attached to the second trim piece at the second attachment point.

5. The parcel shelf assembly of claim 1 wherein each of the first trim piece and the second trim piece include a lip, the first trim piece having a first lip and the second trim piece having a second lip, such that the first lip and the second lip are integrally connected to each of the first trim piece and the second trim piece and extend from each of the respective first trim piece and second trim piece into the cargo area.

6. The parcel shelf assembly of claim 5 wherein the parcel shelf body rests upon the first lip and the second lip when occupying the deployed position.

7. The parcel shelf assembly of claim 1 wherein the plurality of notches includes at least a first notch located at the first end of the first edge and a second notch located at the second end of the first edge.

8. The parcel shelf assembly of claim 7 wherein the first notch interacts with the first trim piece and the second notch interacts with the second trim piece, when the parcel shelf body occupies the stowed position, such that each of the interaction between the first notch and the first trim piece and the interaction between the second notch and the second trim piece restrain the parcel shelf body from further rotation in the first direction from the stowed position into the cargo area.

9. The parcel shelf assembly of claim 1 wherein the parcel shelf body includes a plurality of moveable sections, such that each moveable section may occupy one of a first position and a second position when the parcel shelf body occupies the deployed position.

10. A vehicle comprising:
a passenger compartment;
a cargo area;
a vehicle floor disposed within and extending through each of the passenger compartment and the cargo area;
a partition disposed between and at least partially separating the passenger compartment and the cargo area, wherein the partition is configured to selectively occupy each of a locked upright position and a folded cargo position;
a first trim piece and a second trim piece disposed within the cargo area and proximate to the partition, each of the respective first trim piece and second trim piece having a lip formed along an interior of the respective trim piece that extends from the interior of the respective trim piece and into the cargo area;
a parcel shelf assembly including:
a parcel shelf body having a plurality of edges including at least a first edge and a second edge;
a first attachment feature configured to directly attach the parcel shelf body to the first trim piece and the second trim piece, such that the first edge of the parcel shelf body is disposed adjacent to the partition;
wherein the parcel shelf body is disposed in the cargo area and proximate to the partition and is further configured to selectively occupy each of a deployed position and a stowed position, such that when the parcel shelf body occupies the stowed position, each of the first edge and the second edge of the parcel shelf body is adjacent to the partition, the parcel shelf body is substantially parallel with the partition, and the second edge of the parcel shelf body is positioned between the vehicle floor and the first edge of the parcel shelf body, such that the second edge is disposed closer to the vehicle floor than the first edge of the parcel shelf body;
wherein the parcel shelf body is locked in one of the deployed position and the stowed position when the partition occupies the locked upright position, and
wherein the parcel shelf body is rotatable between the deployed position and the stowed position when the partition occupies the folded cargo position, such that the parcel shelf body is rotatable about the at least one attachment feature in a first direction from the deployed position to the stowed position when the partition occupies the folded cargo position and the parcel shelf body is rotatable about the at least one attachment feature in a second direction from the stowed position to the deployed position when the partition occupies the folded cargo position.

11. The vehicle of claim 10 wherein the first edge of the parcel shelf body includes a first end and a second end, and wherein the parcel shelf body includes a plurality of notches configured to control the rotation of the parcel shelf body, such that the plurality of notches includes at least a first notch located at the first end of the first edge and a second notch located at the second end of the first edge of the parcel shelf body.

12. The vehicle of claim 11 wherein the first notch has a first abutment edge that interacts with the first trim piece defining a first abutment and the second notch has a second abutment edge that interacts with the second trim piece defining a second abutment when the parcel shelf body occupies the stowed position; and wherein each of the first abutment and the second abutment restrain the parcel shelf body from rotation in the first direction from the stowed position into the cargo area of the vehicle.

13. The vehicle of claim 10 wherein the parcel shelf body rests upon each of the lips extending from each of the first trim piece and the second trim piece, when the parcel shelf body occupies the deployed position.

14. The vehicle of claim 10 wherein the partition is a foldable bench seat.

15. The vehicle of claim 10 wherein the parcel shelf body includes a plurality of moveable sections, such that each moveable section may occupy one of a first position and a second position when the parcel shelf body occupies the deployed position.

* * * * *